United States Patent
Byron et al.

(10) Patent No.: US 10,229,154 B2
(45) Date of Patent: *Mar. 12, 2019

(54) SUBJECT-MATTER ANALYSIS OF TABULAR DATA

(71) Applicant: International Business Machines Corporation, Armonk, NY (US)

(72) Inventors: Donna K. Byron, Petersham, MA (US); Scott N. Gerard, Wake Forest, NC (US); Alexander Pikovsky, Lexington, MA (US); Matthew B. Sanchez, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/362,138

(22) Filed: Nov. 28, 2016

(65) Prior Publication Data
US 2017/0075983 A1 Mar. 16, 2017

Related U.S. Application Data

(63) Continuation of application No. 13/945,259, filed on Jul. 18, 2013, now Pat. No. 9,607,039.

(51) Int. Cl.
*G06F 17/22* (2006.01)
*G06F 17/30* (2006.01)
*G06F 17/24* (2006.01)

(52) U.S. Cl.
CPC ...... *G06F 17/30386* (2013.01); *G06F 17/245* (2013.01); *G06F 17/246* (2013.01);
(Continued)

(58) Field of Classification Search
CPC ............ G06F 17/246; G06F 17/30386; G06F 17/245; G06F 17/30943; G06F 17/30598; G06F 17/30339; G06F 17/30011
See application file for complete search history.

(56) References Cited

U.S. PATENT DOCUMENTS 6,442,575 B2 * 8/2002 Pratley ................. G06F 17/245
715/212
6,643,644 B1 * 11/2003 Furusho ............ G06F 17/30952
(Continued)

FOREIGN PATENT DOCUMENTS

EP 12862841 B1 2/2003

OTHER PUBLICATIONS

Appendix P, 2016.
Venetis et al., Recovering semantics of tables on the web, 1996.
U.S. Appl. No. 14/834,810, 17 pages.

*Primary Examiner* — Maikhanh Nguyen
(74) *Attorney, Agent, or Firm* — Garg Law Firm, PLLC; Rakesh Garg; Reza Sarbakhsh

(57) ABSTRACT

A method, system, and computer program product for subject-matter analysis of tabular data are provided in the illustrative embodiments. A first document including the tabular data is received. A library of functional signatures for a first subject-matter domain is selected. A determination is made whether a threshold number of functional signatures from the selected library are applicable to the tabular data, wherein a functional signature is applicable to the tabular data when values in the tabular data correspond to an operation and a table structure specified in the functional signature. Responsive to the threshold number of functional signatures from the selected library being applicable to the tabular data, a processor and a memory process the first
(Continued)

document according to a process for the first subject matter domain selected from a plurality of processes for respective subject matter domains.

13 Claims, 11 Drawing Sheets

(52) U.S. Cl.
CPC .. *G06F 17/30011* (2013.01); *G06F 17/30339* (2013.01); *G06F 17/30598* (2013.01); *G06F 17/30943* (2013.01)

(56) References Cited

U.S. PATENT DOCUMENTS

| | | | | |
|---|---|---|---|---|
| 7,054,871 B2* | 5/2006 | Hu | ................. | G06F 17/245 707/739 |
| 8,255,789 B2* | 8/2012 | Berger | ................. | G06F 17/246 715/212 |
| 8,364,673 B2* | 1/2013 | Chang | ................. | G06F 17/30274 707/728 |
| 8,914,419 B2* | 12/2014 | Gerard | ................. | G06F 17/30 707/802 |
| 2003/0028509 A1* | 2/2003 | Sah | ................. | G06F 17/30595 |
| 2003/0097384 A1* | 5/2003 | Hu | ................. | G06F 17/245 715/234 |
| 2004/0205524 A1* | 10/2004 | Richter | ................. | G06F 17/246 715/213 |
| 2005/0060300 A1* | 3/2005 | Stolte | ................. | G06F 17/30554 |
| 2006/0080646 A1 | 4/2006 | Aman | | |
| 2006/0173834 A1* | 8/2006 | Brill | ................. | G06F 17/30554 |
| 2007/0143369 A1* | 6/2007 | Uppala | ................. | G06F 17/30312 |
| 2007/0204212 A1* | 8/2007 | Chamberlain | ................. | G06F 17/246 715/212 |
| 2008/0288449 A1* | 11/2008 | Kim | ................. | G06F 17/30905 |
| 2012/0011115 A1* | 1/2012 | Madhavan | ................. | G06F 17/30864 707/723 |
| 2014/0122535 A1* | 5/2014 | Gerard | ................. | G06F 17/30 707/802 |
| 2014/0278358 A1* | 9/2014 | Byron | ................. | G06F 17/245 704/9 |

* cited by examiner

FIG. 3

302 — FISCAL YEAR ENDED JANUARY 31, 304

352 — CHANGE 354

| 312 | 2009 306 | 2008 308 | 2007 310 | 2009 vs. 2008 356 | | 2008 vs. 2007 358 | |
|---|---|---|---|---|---|---|---|
| 317 REVENUES AND NONOPERATING INCOME | | | | | | | |
| 316 ELECTRIC | $1,899,457 ⌐324 | $1,605,238 | $1,515,746 | $294,219 | 18.3% | $89,492 | 5.9% |
| 318 GAS | 251,884 ⌐326 | 255,439 | 254,340 | (3,555) | -1.4% | 1,099 | 0.4% |
| 314 TOTAL OPERATING REVENUES | 2,151,341 ⌐322 | 1,860,677 | 1,770,086 | 290,644 | 15.6% | 90,591 | 5.1% |
| 322 NONOPERATING INCOME, NET | 72,008 | 116,956 | 95,987 | (44,948) | -38.4% | 20,969 | 21.8% |
| 320 TOTAL REVENUES AND NONOPERATING INCOME | 2,223,349 | 1,977,633 | 1,866,073 | 245,716 | 12.4% | 111,560 | 6.0% |
| EXPENSES | | | | | | | |
| OPERATING EXPENSES | | | | | | | |
| FUEL, PURCHASED POWER AND DISTRIBUTION GAS | 899,314 | 701,190 | 659,839 | 198,124 | 28.3% | 41,351 | 6.3% |
| STP OPERATION AND MAINTENANCE | 139,073 | 121,754 | 115,269 | 17,319 | 14.2% | 6,485 | 5.6% |
| CPS ENERGY OPERATION AND MAINTENANCE | 323,874 | 311,437 | 277,619 | 12,437 | 4.0% | 33,818 | 12.2% |
| ANNUAL OPEB COST | 13,054 | 13,377 | 16,145 | (323) | -2.4% | (2,868) | -17.1% |
| REGULATORY ASSESSMENTS | 31,257 | 23,192 | 28,645 | 8,065 | 34.8% | (5,453) | -19.0% |
| DECOMMISSIONING | 21,201 | 25,608 | 25,387 | (4,407) | -17.2% | 221 | 0.9% |
| DEPRECIATION, DEPLETION AND AMORTIZATION | 283,398 | 264,657 | 262,375 | 18,741 | 7.1% | 2,282 | 0.9% |
| TOTAL OPERATING EXPENSES | 1,711,171 | 1,461,215 | 1,385,279 | 249,956 | 17.1% | 75,936 | 5.5% |

(DOLLARS IN THOUSANDS)

402: OPERATING REVENUE = COL_SUM ( [ROW_RANGE], [TOPICS=(Operating Revenues, Fiscal Year ended <date>)], [CATEGORIES=(Revenue, <Year>)])

404: OPERATING REVENUE = COL_SUM ( [ROW_RANGE], [TOPICS=(Revenues and Non-Operating Income, Fiscal Year ended <date>)], [CATEGORIES=(Revenue, <Year>)])

406: OPERATING REVENUE = COL_SUM ( [ROW_RANGE], [TOPICS=(Operating Revenues)], [CATEGORIES=(Revenue, <Year>)])

SUMMARY OF REVENUES, EXPENSES AND CHANGES IN FUND NET ASSETS
YEAR ENDED SEPTEMBER 30

|  | 210 | 209 |
|---|---|---|
| OPERATING REVENUES: | | |
| ELECTRIC | $ 1,548,248 | $ 1,525,966 |
| WATER AND SEWER | 302,241 | 249,813 |
| DISTRICT ENERGY SYSTEM | 7,595 | 6,914 |
| OTHER | 50,692 | 48,687 |
| TOTAL OPERATING REVENUES | 1,909,776 | 1,831,380 |
| OPERATING EXPENSES: | | |
| OPERATIONS: | | |
| FUEL | 635,363 | 817,485 |
| PURCHASED POWER | 106,011 | 101,811 |
| OTHER | 216,633 | 202,193 |
| MAINTENANCE | 104,039 | 93,287 |
| DEPRECIATION | 353,606 | 344,158 |
| STATE UTILITY AND FRANCHISE TAXES | 73,120 | 72,127 |
| RECOGNITION AND DEFERRED COSTS AND REVENUES NET | 22,149 | 33,108 |
| TOTAL OPERATING EXPENSES | 1,512,921 | 1,464,169 |
| OPERATING INCOME | 396,855 | 367,211 |

612 (brace around 622)

604
SUMMARY OF REVENUES, EXPENSES AND CHANGES IN FUND NET ASSETS
(DOLLAR IN THOUSANDS)
FISCAL YEAR ENDED JANUARY 31

614

| | 2009 | 2008 | 2007 | CHANGE 2009 vs.2008 | | CHANGE 2008 vs.2007 | |
|---|---|---|---|---|---|---|---|
| REVENUES AND NON OPERATING INCOME | | | | | | | |
| ELECTRIC | $1,899,457 | $1,605,238 | $1,515,746 | $294,219 | 18.3% | $89,492 | 5.9% |
| GAS | 251,884 | 255,439 | 254,340 | [3,555] | -1.4% | 1,099 | 0.4% |
| TOTAL OPERATING REVENUES | 2,151,341 | 1,860,677 | 1,770,086 | 290,664 | 15.6% | 90,591 | 5.1% |
| NONOPERATING INCOME, NET | 12,008 | 116,988 | 98,987 | [44,948] | -38.4% | 20,969 | 21.8% |
| TOTAL REVENUES AND NONOPERATING INCOME | 2,223,349 | 1,977,633 | 1,866,073 | 245,716 | 12.4% | 111,560 | 6.0% |
| OPERATING EXPENSES 624 | | | | | | | |
| FUEL, PURCHASED POWER AND DISTRIBUTION GAS | 899,314 | 701,190 | 659,839 | 193,124 | 28.3% | 41,351 | 6.3% |
| STP OPERATION AND MAINTENANCE | 139,073 | 121,754 | 115,269 | 17,319 | 14.2% | 6,485 | 5.6% |
| CPS ENERGY OPERATION AND MAINTENANCE | 323,874 | 311,437 | 277,619 | 12,437 | 4.0% | 33,818 | 12.2% |
| ANNUAL OPEB COST | 13,054 | 13,377 | 16,145 | [323] | -2.4% | [2,768] | -17.1% |
| REGULATORY ASSESSMENTS | 31,257 | 23,192 | 28,645 | 8,065 | 34.8% | [5,453] | -19.0% |
| DECOMMISSIONING | 21,201 | 25,608 | 25,387 | [4,407] | -17.2% | 221 | 0.9% |
| DEPRECIATION, DEPLETION AND AMORTIZATION | 283,398 | 264,857 | 262,375 | 13,741 | 7.1% | 2,282 | 0.9% |
| TOTAL OPERATING EXPENSES | 1,711,171 | 1,461,215 | 1,385,279 | 249,956 | 17.1% | 75,936 | 5.5% |

606

| | 2004 | 2005 | 2006 | 2007 | 2008 |
|---|---|---|---|---|---|
| OPERATING REVENUES | | | | | |
| LANDING FEES | $131,406 | $157,791 | $159,094 | $179,076 | $181,283 |
| RENTAL REVENUES: | | | | | |
| TERMINAL RENTALS/USE CHARGES | 96,870 | 140,038 | 145,417 | 211,732 | 235,210 |
| OTHER RENTALS/FUELING SYSTEM FEES | 96,870 | 140,038 | 145,417 | 211,732 | 235,210 |
| SUB-TOTAL RENTAL REVENUES | 35,316 | 36,365 | 40,172 | 51,026 | 47,378 |
|  | 132,186 | 176,403 | 185,589 | 262,758 | 282,588 |
| CONSSESIONS: | | | | | |
| AUTO PARKING | 90,421 | 95,521 | 98,613 | 103,137 | 108,545 |
| AUTO RENTALS | 17,340 | 19,604 | 19,928 | 22,376 | 22,213 |
| RESTAURANTS | 27,161 | 29,790 | 33,401 | 34,904 | 34,813 |
| NEWS/GIFTS | 11,001 | 11,893 | 12,357 | 13,267 | 14,640 |
| OTHER[1] | 21,501 | 33,125 | 30,374 | 34,909 | 34,912 |
| SUB-TOTAL CONSSESIONS | 167,424 | 189,933 | 194,673 | 208,593 | 215,123 |
| REIMBURSEMENTS | 11,553 | 8,750 | 6,560 | 2,336 | 5,288 |
| TOTAL OPERATING REVENUES | $442,589 | $532,877 | $545,916 | $652,763 | $684,282 |
| OPERATION AND MAINTENANCE EXPENSES | | | | | |
| SALARIES AND WAGES[2] | $153,926 | $157,116 | $168,361 | $177,800 | $177,418 |
| REPAIRS AND MAINTENANCE | 66,086 | 73,903 | 73,591 | 83,865 | 100,341 |
| ENERGY | 22,270 | 30,894 | 29,118 | 35,924 | 38,535 |
| MATERIALS AND SUPPLIES | 8,228 | 9,338 | 5,120 | 10,411 | 17,506 |
| ENGINEERING AND OTHER PROFESSIONAL SERVICES | 35,533 | 52,142 | 45,357 | 56,506 | 61,514 |
| OTHER OPERATING EXPENCES | 31,807 | 28,572 | 33,038 | 33,628 | 33,196 |

616 626

SUBJECT-MATTER ANALYSIS OF TABULAR DATA

BACKGROUND

1. Technical Field

The present invention relates generally to a method, system, and computer program product for processing of documents. More particularly, the present invention relates to a method, system, and computer program product for subject-matter analysis of tabular data.

2. Description of the Related Art

Documents include information in many forms. For example, textual information arranged as sentences and paragraphs conveys information in a narrative form.

Some types of information are presented in a tabular organization. For example, a document can include tables for presenting financial information, organizational information, and generally, any data items that are related to one another through some relationship.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

SUMMARY

The illustrative embodiments provide a method, system, and computer program product for subject-matter analysis of tabular data. An embodiment receives a first document including the tabular data. The embodiment selects a library of functional signatures for a first subject-matter domain. The embodiment determines whether a threshold number of functional signatures from the selected library are applicable to the tabular data, wherein a functional signature is applicable to the tabular data when values in the tabular data correspond to an operation and a table structure specified in the functional signature. The embodiment processes, according to a process for the first subject matter domain selected from a plurality of processes for respective subject matter domains, using a processor and a memory, the first document responsive to the threshold number of functional signatures from the selected library being applicable to the tabular data.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts an example of tabular data within which functional relationships and signatures can be identified in accordance with an illustrative embodiment;

FIG. 4 depicts an example representation of a functional signature in accordance with an illustrative embodiment;

FIG. 6 depicts a block diagram of an example manner of classifying documents with tabular data in accordance with an illustrative embodiment;

DETAILED DESCRIPTION

Figure 1:
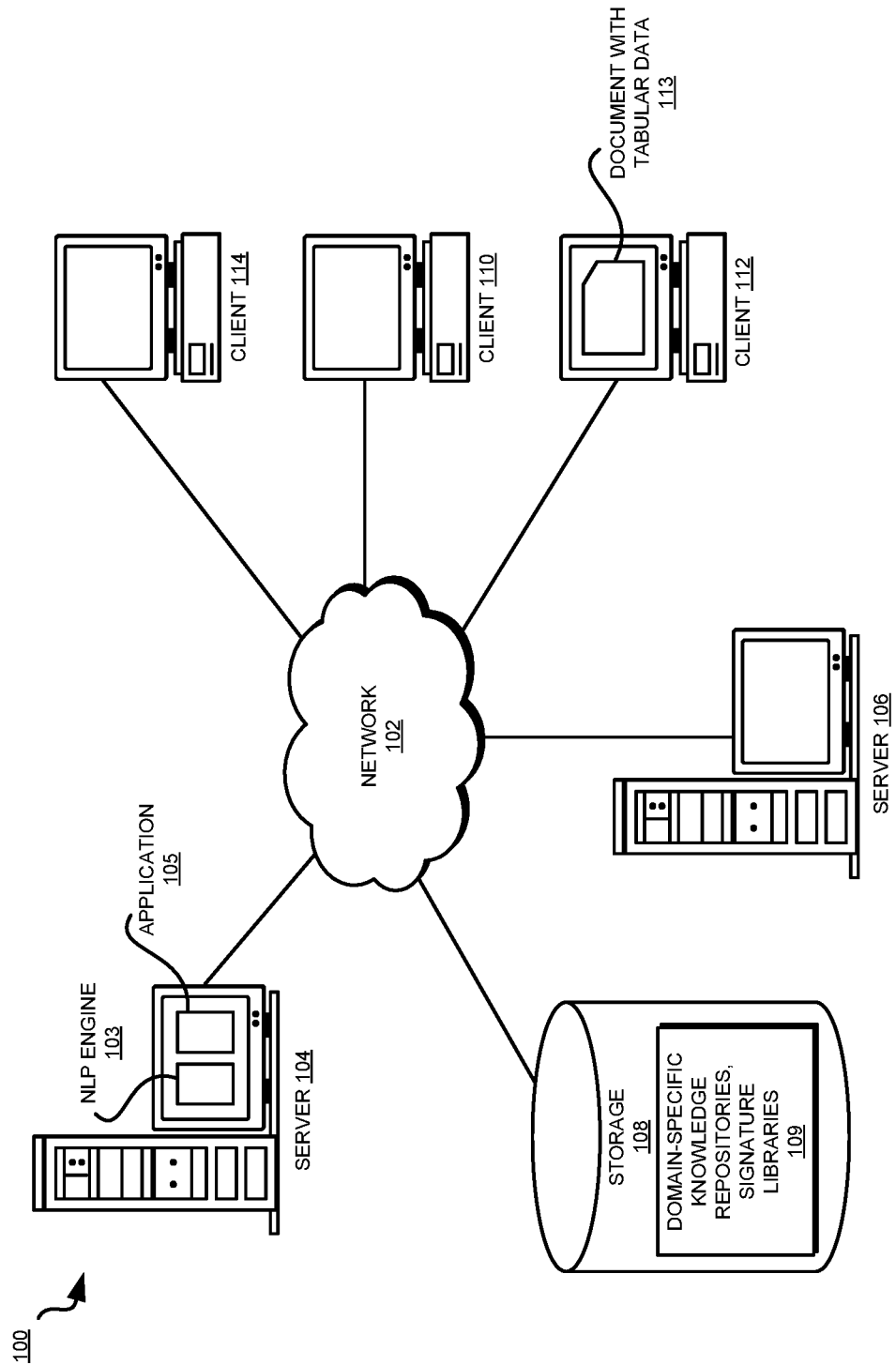
FIG. 1 depicts a pictorial representation of a network of data processing systems in which illustrative embodiments may be implemented.

The illustrative embodiments recognize that documents subjected to NLP commonly include tabular data, to wit, content in the form of one or more tabular data structures (tables). A cell of a table is a containing unit within a table, such that the contents of the cell can be uniquely identified by a row and column or other suitable coordinates of the table.

The illustrative embodiments recognize that information presented within the cells of a table often relates to information in other cells of the same table, cells of a different table in the same document, or cells or a different table in a different document. The relationships between the information contained in different cells is important for understanding the meaning of the tabular data, and generally for understanding the meaning of the document as a whole.

Many domain-specific documents, especially in financial, medical, and other subject-matter domains (domains), have critical information inside numerous tables. A user might, for example, want to know what was a municipality's operating income was, or what comprised the municipality's revenue. The information needed to answer such a question is frequently found only inside a table rather than in the narrative text of a financial document.

Recovering information from within tables has been historically a difficult problem. The illustrative embodiments recognize that specialized processing or handling is needed in NLP for interpreting the tabular data correctly and completely. Presently available technology for understanding the relationship between cell-values is limited to heuristically guessing a label for a cell using the row or column titles.

The illustrative embodiments used to describe the invention generally address and solve the above-described problems and other problems related to the limitations of presently available NLP technology. The illustrative embodiments provide a method, system, and computer program product for subject-matter analysis of tabular data.

The illustrative embodiments recognize that a cell in a table can depend on other one or more cells in the table, cells across different tables in the given document, or cells across different tables in different documents. The dependency of one cell on another is functional in nature, to wit, dependent based on a function. The functions forming the bases of such functional dependencies (also referred to as functional relationships or functional relations) can be, for example, any combination of mathematical, statistical, logical, or conditional functions that operate on certain cell-values to impart cell-values in certain other cells.

As an example, a cell containing a total amount is functionally dependent upon, or related to, the cells whose values participate in the total amount. As another example, a statistical analysis result cell, such as a cell containing a variance value in an experiment, can be functionally dependent on a set of other cells, perhaps in another table, where the outcomes of the various iterations of the experiment are recorded.

These examples are not intended to be limiting on the illustrative embodiments. Functional dependencies are indicative of relationships between the cells of one or more tables, and are highly configurable depending on the data in a table or document, purpose there for, and the meaning of the various cells.

Furthermore, a cell can participate in any number of functional dependencies or relationships, both as a dependant cell and/or as a depended-on cell. Because information in a cell can relate to information available anywhere in a given document, a functional dependency of a cell can include depending on non-tabular data in a given document as well.

The illustrative embodiments improve the understanding of the information presented in tabular form in a document by enabling an NLP tool to understand relationships of cells of tabular data. The illustrative embodiments provide a way of determining the functional dependencies of cells in a table on other cells, surrounding text of the table, contents in a document, or a combination thereof. By using quantitative analysis of functional relations between the table cells, combined with linguistic and/or semantic analysis of the cells within the tables, the illustrative embodiments improve the understanding of tabular information, without relying exclusively on external knowledge sources.

An illustrative embodiment determines whether a block of a given tabular data includes certain domain-specific functional relationships. In other words, an illustrative embodiment performs subject-matter analysis of tabular data to determine whether the information in the tabular data matches with a functional signature within a threshold measure of similarity. A functional signature (signature) is an expression of functional and semantic relationships between one or more cells in one or more portions of one or more tables, where document-specific information or table-specific information has been normalized to subject-matter domain specific references. Functional relationships between the cells include the functional dependencies that are discovered between those cells. Semantic relationships between cells include the similarities, dependencies, or organizational relationships between the semantic identifiers associated with the cells, e.g., the headers, markup clues, indentations, offsets, and the like. The examples of the functional relationships and semantic relationships included in a functional signature are not intended to be limiting on the illustrative embodiments. Those of ordinary skill in the art will be able to conceive other similarly purposed features of tabular data that can be used in a functional signature according to an embodiment, and the same are contemplated within the scope of the illustrative embodiments.

If the illustrative embodiments finds such a block, the embodiment retrieves the information contained in that block by making inferences about the block's contents and/or by using a predefined template. For example, suppose an embodiment receives a query relative to a county's financial report document. Assume, for example, that the query asks for the composition of the county's revenue for fiscal year 2007. An embodiment looks for a block that has a functional signature, which uses an operator "SUM", using row category type of "Revenue", column category with value type of "Year", and column value matching a desired value, e.g., "2007".

Note that information, such as revenue categories, need not be 'flat' in a block, and there may exist some intermediate calculations within the block. This complication makes answering the above question a very difficult problem to solve with the presently available technology. Presently available table extraction technology looks for components of revenue, and therefore, would likely return a noisy and imprecise answer. In contrast, the query receives a precise answer owing to an embodiment's ability to discover structural and semantic macro-level knowledge from the given tabular data. Furthermore, an embodiment also makes many different types of queries possible. For example, an embodiment can precisely answer a query that asks for all sources of revenue. Another embodiment can precisely answer a query that asks for just the raw components of revenue.

As another example, an embodiment improves answering queries and reasoning based on the subject-matter analysis of the tabular data of a document. For example, answering a certain class of questions requires insight into one or more portions of one or more tables. For example, consider questions such as, "What are the components of revenue?", "What are the water system's top customers?", or "Which product lines grew their revenue from 2010 to 2011?" In such questions, the subject-matter analysis of an embodiment infers knowledge from tabular data to determine, for example, which data cells are within the category 'revenue/customer/product lines', analyzes the functional relations between the cell values, and provides the answers to the quantitative portion of the question. The illustrative embodiments recognize that automated answering of such questions depends on automated detailed analysis of the table structure as pertains to a subject-matter domain.

The improved understanding of tabular data according to an illustrative embodiment is useful in many other ways. For example, documents in the same subject-matter domain, such as annual financial statements, usually include similar information in tables, although the information may be presented, worded, or organized differently. Presently, tables are mostly ignored during NLP of documents. An embodiment enables classifying a document into proper subject-matter domains and sub-domains based on the analysis of subject-matter domain specific analysis of the tabular data contained therein. Because of the amount of information contained in tabular form, such analysis by an embodiment improves document classification.

For example, many financial documents in a given domain will contain a standard set of tables. For example, annual disclosures of a municipality or a utility would likely contain tables describing largest customers, debt service numbers, revenue and expenses, the balance sheet, etc. From one municipality and one document to another, these tables may be located in different parts of the document, be formatted differently and have somewhat different content. However, each of these will contain blocks with common functional signatures because these are dictated by similar guidelines and legal practices. For example, commonly used fiscal data is often calculated using similar guidelines. Accordingly, an embodiment concludes that at the functional level the blocks containing similar information will contain similar functional signatures. An embodiment can then determine the type of a given table region or portion simply by inspecting how the table's structure maps to a given domain's functional signatures (domain's signature library). The embodiment can then classify documents that have similar table types in a common category or classification.

A query, such as in the examples above, might be answered with information from multiple documents, and in those documents the tables can have significant structural differences. An embodiment, using functional signatures, recognizes that the information presented in the documents is similar despite the differences in the organization. For example, for an given example set of financial reports from various companies, if the query were "which Chicago-area companies had earnings growth above twenty percent in 2009?". The various companies may format their earnings reports differently, yet an embodiment enables finding the equivalent information in various documents regardless of the variations in structure or formatting of that information. Essentially, an embodiment enables an analysis of tabular information by casting the information from a document-layout representation to a functional and semantic representation, exploiting the fact that similarly purposed documents are conventionally obligated to convey similar key pieces of information.

Thus, an embodiment goes beyond the basic task of finding and extracting facts from individual tables, and allows for assimilating information, answering queries, and categorizing documents, in a manner not possible by merely parsing tabular data. In a given set of documents, an embodiment automatically detects common table types, blocks with similar functional signatures (functional blocks), and reasoning or logic behind the structure of the tabular data. Optionally, a domain expert can review, approve, or modify these automated findings.

As another example of the usefulness of the illustrative embodiments, an embodiment uses these findings to populate or enrich domain-specific knowledge repositories, such as named entity lists, ontologies, and lexicons. Such structured knowledge can aid in reliably extracting functional relationships in new documents, new functional relationships, or to confirm hypotheses about the relations between category headings. Such structured knowledge can also aid other processes, such as document classifications, translations, or NLP, by providing a richer, more precise, and more complete repository for such usages.

The illustrative embodiments are described with respect to certain documents and tabular data only as examples. Such documents, tabular data, or their example attributes are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
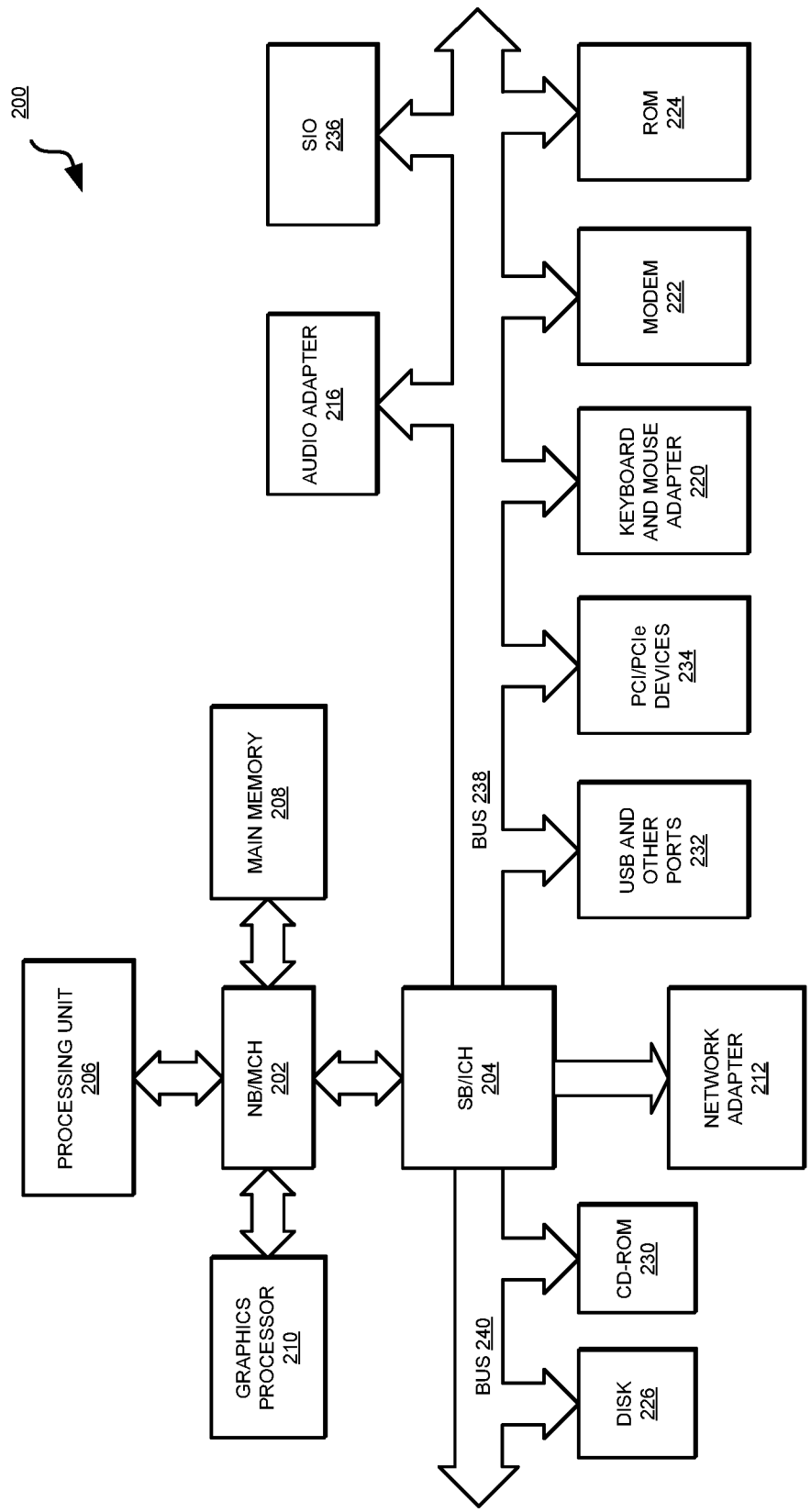
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with NLP engine 103. NLP engine 103 may be, for example, an existing application capable of performing natural language processing on documents, and may be modified or configured to operate in conjunction with application 105 to perform an operation according to an embodiment described herein. Storage 108 includes domain-specific knowledge repositories, signature libraries, or a combination thereof, 109 according to an embodiment. Client 112 includes document with tabular data 113 that is processed according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications.

Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications, logic, or programs, such as application 105 and repositories and signatures 109 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts an example of tabular data within which functional relationships and signatures can be identified in accordance with an illustrative embodiment. Table 300 is an example of tabular data appearing in document 113 in FIG. 1 within which functional dependencies can be determined using application 105 in FIG. 1.

The horizontal or vertical rule-lines are depicted for bounding a table and cell only as an example without implying a limitation thereto. A table or tabular data can be expressed in any suitable manner, and a cell can be demarcated in any manner within the scope of the illustrative embodiments. For example, indentation, spacing between cell data, different spacing in tabular and non-tabular content, symbols, graphics, a specific view or perspective to illustrate tabular data, or a combination of these and other example manner of expressing tabular data and cells therein are contemplated within the scope of the illustrative embodiments.

Table 302 is a portion of table 300 and includes several headers that serve to organize the data in the various cells into headings, categories, or classifications (categories). The headers can be row-headers or column headers. The headers are not limited to the table boundaries or extremities within the scope of the illustrative embodiments. For example, a header can be embedded within a table, between cells, such as in the form of a sub-header, for example, to identify a sub-category of tabular data. Such sub-row or sub-column headers are contemplated within the scope of the illustrative embodiments. In one embodiment, certain header information can be specified separately from the corresponding tabular data, such as in a footnote, appendix, another table, or another location in a given document.

For example, header 304 identifies a group of columns, which include data for the broad category of "fiscal year ended January 31." Headers 306, 308, and 310 identify sub-categories of the "fiscal year ended January 31" data, to wit, by year, for three example years.

Row headers 312 include some clues. For example, row header 314 is a "total" and is indented under row headers 316 and 318. Similarly, row header 320 is another "total" and is indented under row header 322. The indentations at row headers 314 and 320 are example clues that are useful in understanding the functional relationships between cells in the same row as row headers 314 and 320, and other cells in table 302. The word "total" in row headers 314 and 320 are another example of the clues usable for determining functional dependencies of cells in their corresponding rows in a similar manner.

These example clues are not intended to be limiting on the illustrative embodiments. Many other clues will be conceivable from this disclosure by those of ordinary skill in the art, and the same are contemplated within the scope of the illustrative embodiments.

The same clues help understand the information in different cells differently. For example, consider table 352, which is another portion of table 300. Header 354 identifies a group of columns, which include data for the broad category of "Change." Headers 356 and 358 identify sub-categories of the "change" data, to wit, by comparing two consecutive years, from the three example years of categories 306, 308, and 310.

Row headers 312 impart different meanings to the cells in their corresponding rows in tables 302 and 352. For example, while the "total" according to row header 314 implies a dollar amount of income in the corresponding cells in table 302, the same row header implies a dollar amount change and a percentage change in the corresponding cells in table 352. As in this example table 300, in an embodiment, the clues in one location, such as in row headers 312, can also operate in conjunction with other clues, data, or content in other places, to enable determining the meaning of certain cells in a given tabular data.

With reference to FIG. 4, this figure depicts an example representation of a functional signature in accordance with an illustrative embodiment. Functional signature (signature) 402 can be applied to a block of tabular data in table 302 in FIG. 3.

For example, signature 402 indicates that a table cell that might contain information about "operating revenue" or some domain-specific equivalent thereof, should be a column summation of values of the cells in a range of rows in that column, where the cells are identified by one or more of a domain-specific list of topics, one or more of a domain-specific list of categories, or a combination thereof. In one example embodiment, within the "finance" domain, the operating revenues can generally be found in tabular data under certain topics. An example list of topics in signature 402 includes the terms "Operating Revenues" and "Fiscal Year Ended <date>." In the example embodiment, within the "finance" domain, data pertaining to the various components of the operating revenue can be found categorized as "revenue" for certain "year". An example list of categories in signature 402 includes the terms "revenue" and "<year>."

As another example, within the "finance" domain in another example embodiment, signature 404 indicates that the operating revenues can generally be found under an example list of topics that include the terms "Operating Revenues", including the "Non-Operating Income", and "Fiscal Year Ended <date>." In the example embodiment, within the "finance" domain, data pertaining to the various components of the operating revenue can be found categorized as "revenue" for certain "year". An example list of categories in signature 402 includes the terms "revenue" and "<year>." As another example, within the "finance" domain in another example embodiment, signature 406 indicates that the operating revenues can generally be found under an example list of topics that include the terms "Operating Revenues", regardless of any specific date or year.

While the example functional signatures are described with respect to financial data and topic lists generally found in tabular data pertaining to the financial domain, such examples are not intended to be limiting on the illustrative embodiments. Generally, a functional signature can use any arithmetic, statistical, or another type of computation over two or more cells of a given set of tabular data, over one or more row-ranges, column-ranges, or a combination thereof. Furthermore, a functional signature can use any number of lists of any lengths from any subject matter domain in such computations without limitations. As an example, tabular data pertaining to scientific experimentation may include times, iterations, constraints, and the likes in the topic lists or categories lists. As another example, tabular data pertaining to geological surveys may includes locations, depths, strata layer names, quantities, and the likes in the topic lists or categories lists.

Figure 5:
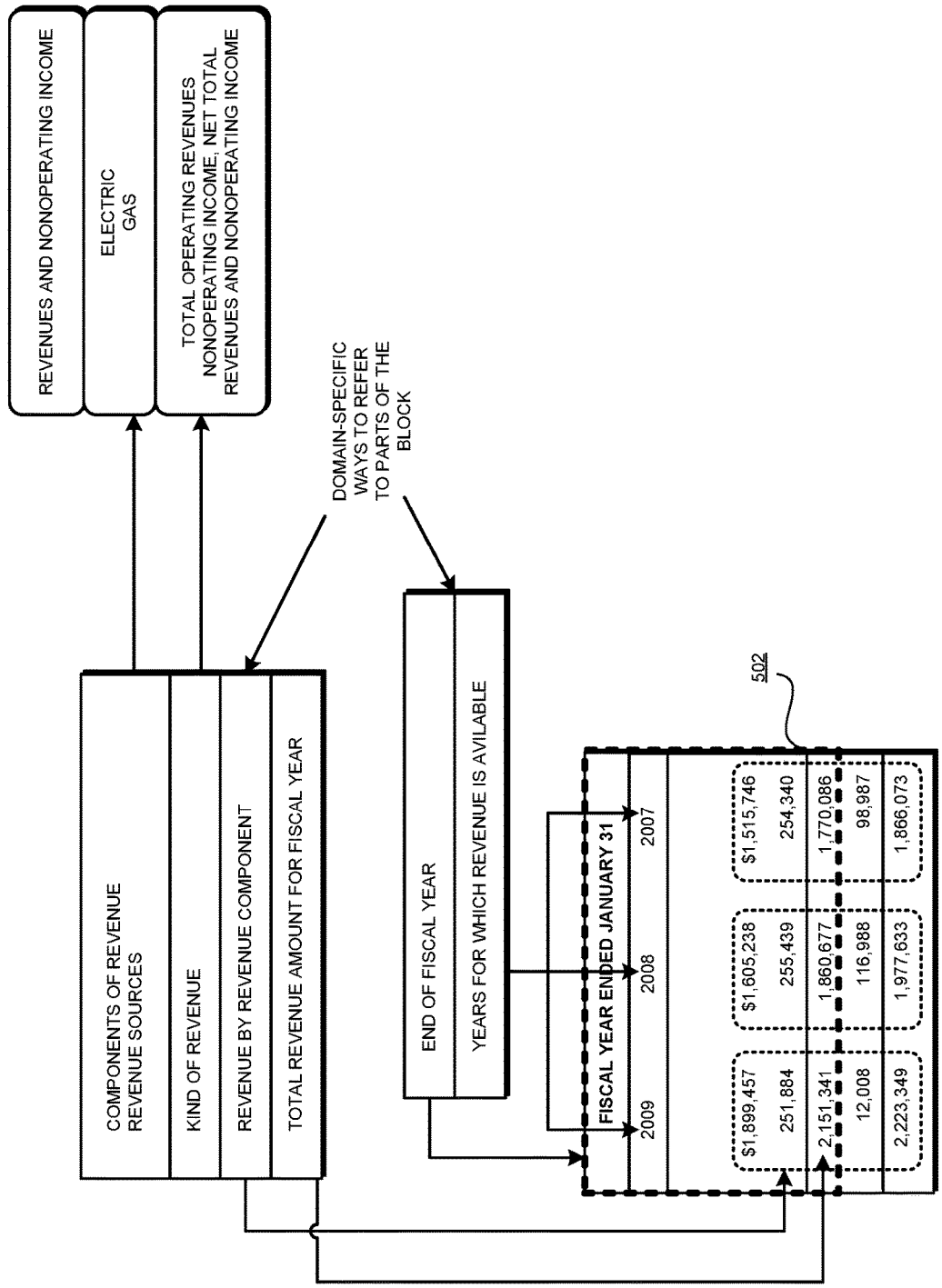
FIG. 5 depicts a block diagram of an example operation of a functional signature in accordance with an illustrative embodiment.

With reference to FIG. 5, this figure depicts a block diagram of an example operation of a functional signature in accordance with an illustrative embodiment. Block 502 is an example block of tabular data from example table 302 in FIG. 3 on which example signature 402 of FIG. 4 operates.

Each domain can correspond to one or more libraries of previously determined signatures that are unique to a domain or shared across more than one domain.

Each signature describes the pattern and a meaning of data inside functional block. In the process of describing the pattern and meaning of the data according to a signature, application 105 identifies a type of the various parts of a given block and ways of referring to those parts of the block.

Consider for example, block 502 of table 302 in FIG. 3. Application 105 of FIG. 1, implementing an embodiment, discovers block 502 in table 302. Application 105 determines that signature 402 applies to cell 522 ("total operating revenues") for the cell-range that includes cells 324 and 326, because cells 324 and 326 include values under topics 304 ("fiscal year ended January 31") and 314 ("[Total] operating revenues"), and categories 317 ("Revenues[ ]") and 306 ("2009"). Thus, application 105 concludes that block 502 depicts operating revenues and their breakdown, table 302 is a financial table, and this tabular information in the example document pertains to revenues or some variation thereof.

Although only the comparison with signature 402 is described here, application 105 of FIG. 1 can similarly compare discovered functional/semantic block 502 with any number of signatures in a set of known signatures for the subject-matter domain of table 302.

With reference to FIG. 6, this figure depicts a block diagram of an example manner of classifying documents with tabular data in accordance with an illustrative embodiment. Table 604 is similar to table 302 in FIG. 3.

Application 105 of FIG. 1, implementing an embodiment, receives tables 602, 604, and 606 in different documents. In the manner described with respect to FIGS. 4 and 5, application 105 identifies blocks 612, 614, and 616 in tables 602, 604, and 606, respectively, as functional blocks.

For example, application 105 determines that cells 622, 624, and 626 in tables 602, 604, and 606, respectively, contain operating revenue information, even though that operating revenue information is presented differently in those tables, and includes different components. Accordingly, application 105 determines signature 402 applies to blocks 612, 614, and 616 due to the patterns and reasoning relative to cells 622, 624, and 626. Application 105 further determines that because signature 402 applies to tables 602, 604, and 606, the documents where these tables are included are financial reports and discuss revenues or some variation thereof.

Figure 7:
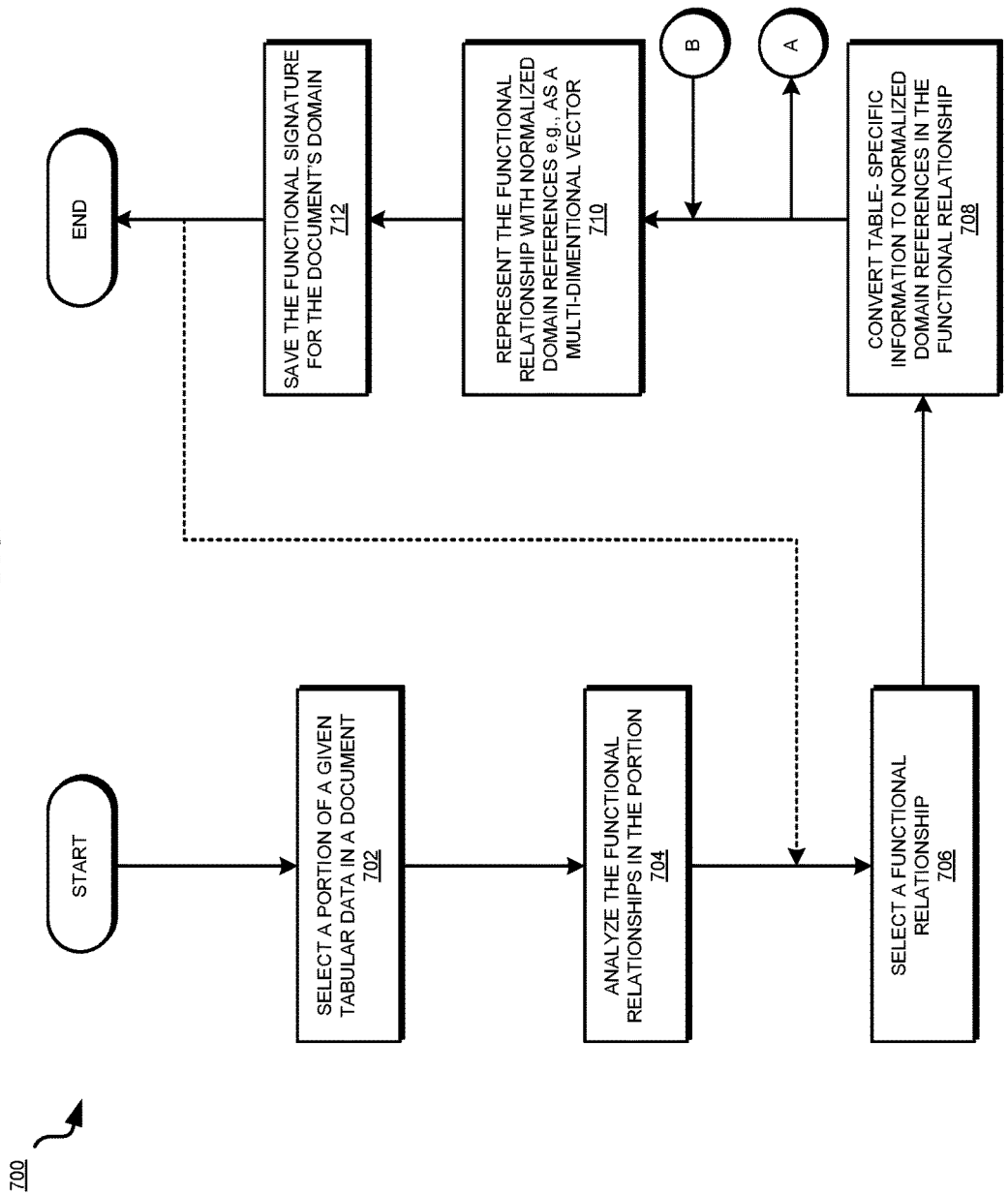
FIG. 7 depicts a flowchart of an example process of constructing a functional signature in accordance with an illustrative embodiment.

With reference to FIG. 7, this figure depicts a flowchart of an example process of constructing a functional signature in accordance with an illustrative embodiment. Process 700 can be implemented in application 105 in FIG. 1.

Process 700 selects a portion of tabular data in a given document (step 702). For example, process 700 selects block 502 in FIG. 5 from table 302 in FIG. 3.

Process 700 analyzes the one or more functional relationships in the selected portion (step 704). Process 700 selects a functional relationship from the one or more functional relationships (step 706).

Process 700 converts table-specific information in the functional relationship to normalized domain references (step 708). For example, process 700 replaces document-specific terms and terminology used in the tabular data with generalized equivalent terms that are either commonly understood or are recognized in the domain to which the document belongs. In one embodiment, process 700 may exit at exit point marked "A" and re-enter at entry point marked "B" after step 708. The exit and the re-entry are to and from process 1100 in FIG. 11.

Process 700 represents the functional relationship with normalized domain references, forming a functional signature (step 710). For example, in one embodiment, a functional signature is represented in the form of a multi-dimensional vector where the normalized domain references are the vector attributes.

Process 700 saves the functional signature for the document's domain, such as in a signature library corresponding to the domain, or a collection of signatures corresponding to the document (step 712). Process 700 may end thereafter, or return to step 706 to select another functional relationship and perform another iteration.

Figure 8:
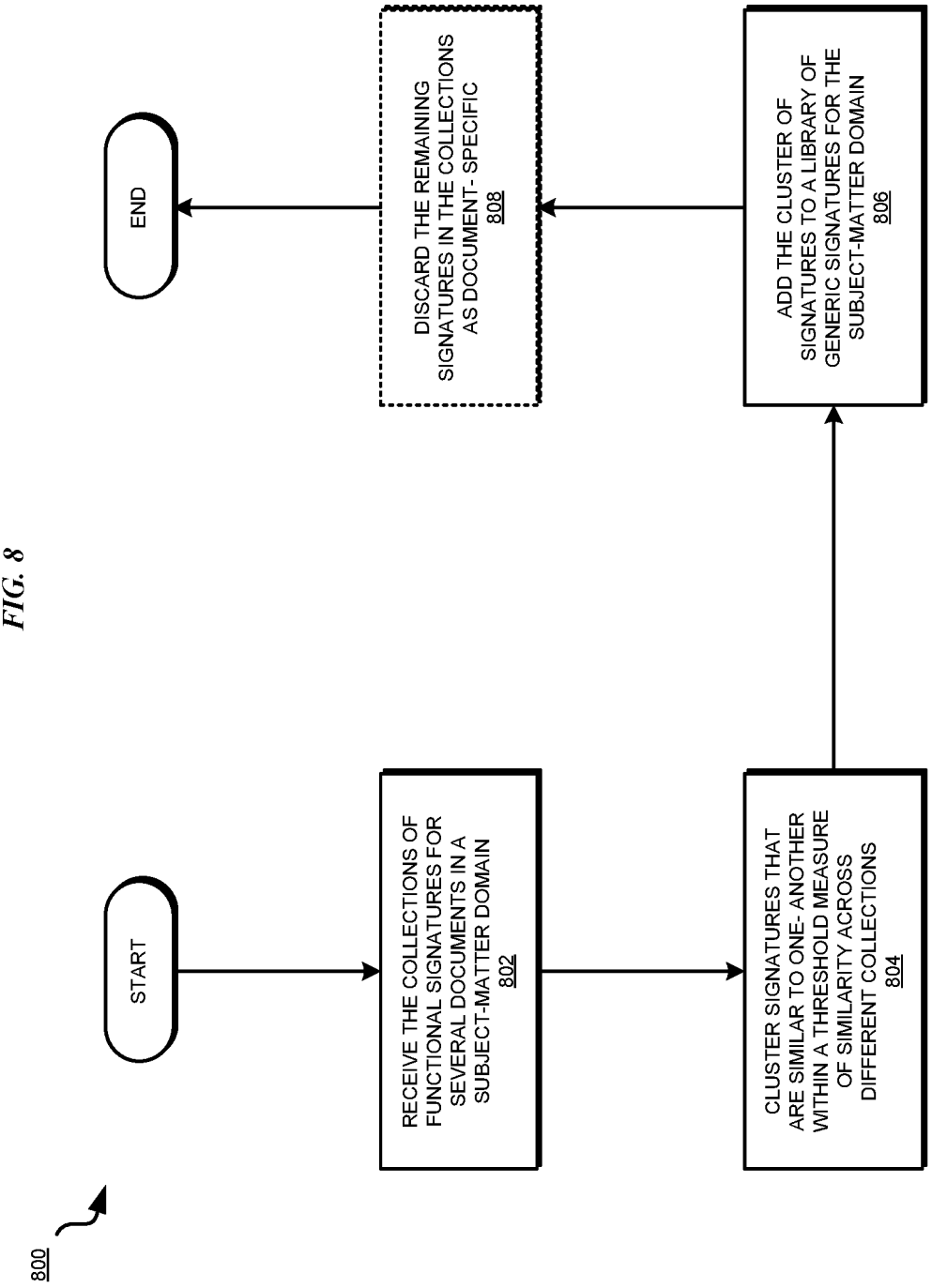
FIG. 8 depicts a flowchart of an example process of creating a signature library in accordance with an illustrative embodiment.

With reference to FIG. 8, this figure depicts a flowchart of an example process of creating a signature library in accordance with an illustrative embodiment. Process 800 can be implemented in application 105 in FIG. 1.

Process 800 begins by receiving, retrieving, or otherwise accessing different collections of functional signatures corresponding to different documents in a given subject-matter domain (step 802). Process 800 clusters those signatures together that are similar to one-another within a threshold measure of similarity across the different collections (step 804). Process 800 adds the cluster of signatures to a library of generic functional signatures for the subject-matter domain (step 806). Process 800 optionally discards the remaining signatures in the collections for being document-specific and not generically applicable to the subject-matter domain (step 808). Process 800 ends thereafter.

Figure 9:
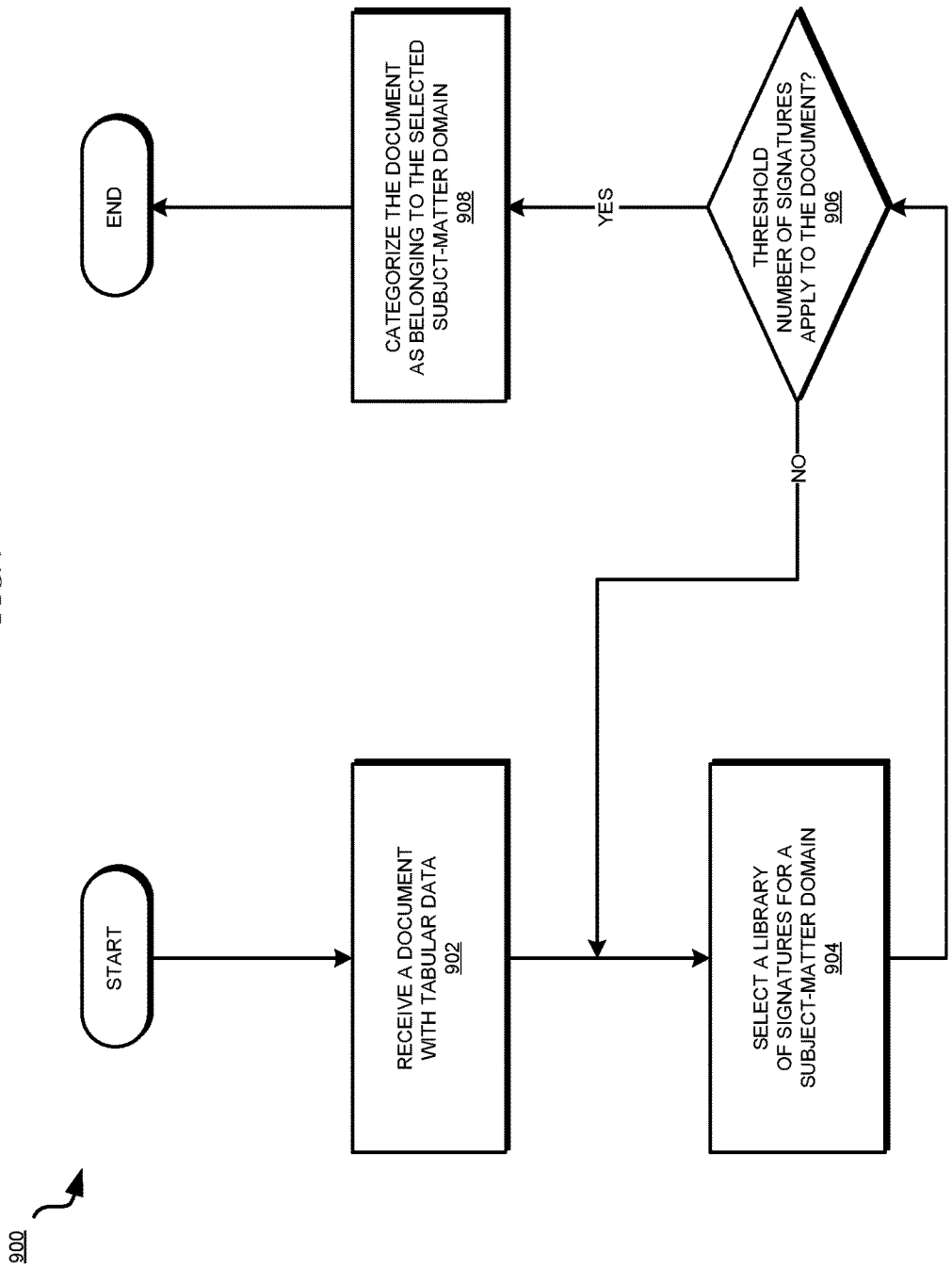
FIG. 9 depicts a flowchart of an example process for categorizing a document using functional signatures in accordance with an illustrative embodiment.

With reference to FIG. 9, this figure depicts a flowchart of an example process for categorizing a document using functional signatures in accordance with an illustrative embodiment. Process 900 can be implemented in application 105 in FIG. 1.

Process 900 begins by receiving a document that includes tabular data (step 902). Process 900 selects a library of signatures for a subject-matter domain (step 904). The selecting of a library can be arbitrary, heuristics based, based on external information about the document, based on partial analysis of the document's contents, or by any other method of selection.

Process 900 determines whether a threshold number of signatures in the library are applicable to the document within a threshold measure of applicability (step 906). If a threshold number of signatures in the library are not applicable to the document within a threshold measure of applicability ("No" path of step 906), process 900 determines that an incorrect signature library was selected, and returns to step 904 for selecting another signature library (step 906). Note that step 906 is only depicted for the clarity of process 900, and is only an example manner of determining whether the document can be categorized in a particular subject-matter domain. The determination of step 906 can be a stand-alone categorization process (not shown) to which control is passed from process 900 and which returns the control back to process 900 in the manner shown. Within the scope of the illustrative embodiments, such a categorization process can use the example manner of categorization as shown in step 906, other suitable method for categorizing the document using the selected signature library, or a combination of more than one methods for categorization of the document.

If a threshold number of signatures in the library are applicable to the document within a threshold measure of applicability ("Yes" path of step 906), process 900 categorizes the document as belonging to the subject-matter domain corresponding to the selected signature library (step 908). Process 900 ends thereafter.

Figure 10:
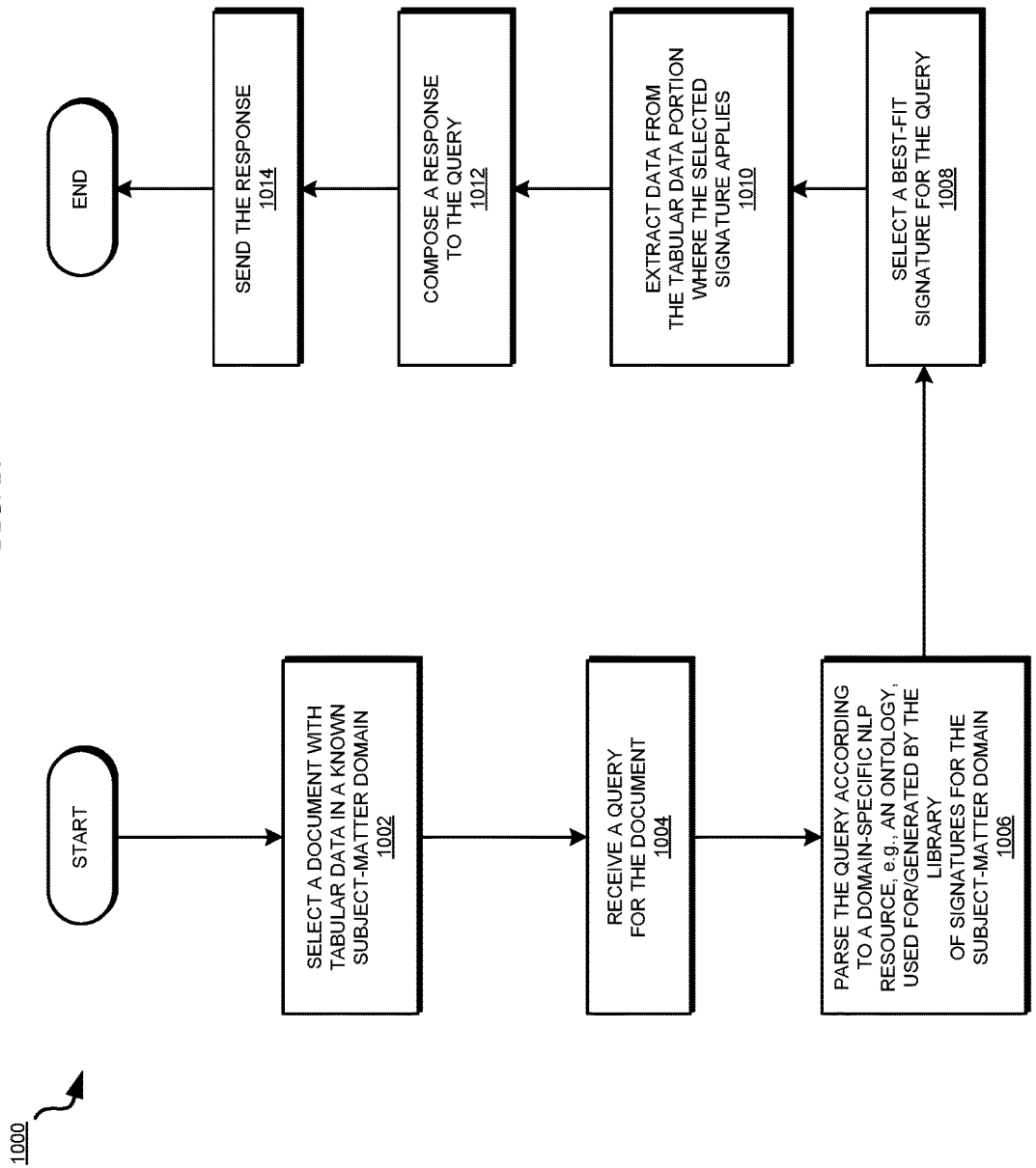
FIG. 10 depicts a flowchart of an example process of responding to queries using subject-matter analysis of tabular data in accordance with an illustrative embodiment.

With reference to FIG. 10, this figure depicts a flowchart of an example process of responding to queries using subject-matter analysis of tabular data in accordance with an illustrative embodiment. Process 1000 can be implemented in application 105 in FIG. 1.

Process 1000 begins by selecting a document with tabular data, the document belonging to a known subject-matter domain (step 1002). Process 1000 receives a query for the document (step 1004). Process 1000 parses the query according to domain-specific NLP resources, e.g., an ontology, used for or generated by the library of signatures for the subject-matter domain of the document (step 1006).

Process 1000 selects a best-fit signature for the query (step 1008). Process 1000 extracts data from the tabular data portion where the selection signature applies (step 1010). Process 1000 composes a response to the query using the extracted data, such as by passing the data to a NLP engine (step 1012). Process 1000 sends the response, or causes the response to be sent (step 1014). Process 1000 ends thereafter.

Figure 11:
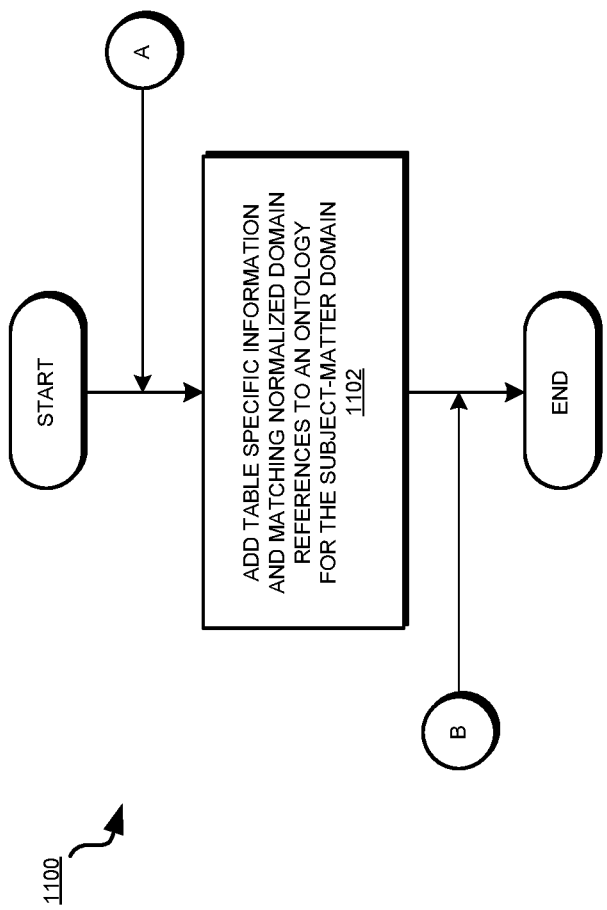
FIG. 11 depicts a flowchart of an example process for creating or improving a knowledge repository in accordance with an illustrative embodiment.

With reference to FIG. 11, this figure depicts a flowchart of an example process for creating or improving a knowledge repository in accordance with an illustrative embodiment. Process 1100 can be implemented in application 105 in FIG. 1.

Process 1100 begins or enters from entry point "A". Process 1100 adds table-specific information and the matching normalized domain references to a knowledge repository, such as an ontology, for the subject-matter domain in question (step 1102). Process 1100 ends or exits at exit point "B" thereafter. The table specific information and the matching normalized domain references are available at step 708 in process 700 in FIG. 7, and are used in step 1102.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for subject-matter analysis of tabular data. An embodiment discovers functional blocks in a table. The embodiment combines them with the table's layout and semantic analysis to identify functional signatures. The embodiment uses the functional signatures for information extraction from the tabular data.

An embodiment performs a classification operation on an initial set of documents from a specific domain. This operation finds a set of functional signatures that are pertinent to the documents in this domain. Optionally, a human expert can review the automated findings of an embodiment and select or modify signatures that should be used in this domain. An embodiment includes a trained classifier on a corpus of documents to extract document-specific information, match such information to normalized domain references, and populate domain-related knowledge resources, such as named entity lists and ontologies.

Some embodiments are further adaptable for additional uses. For example, an embodiment can be tuned for selective extraction of information such that only certain parts of the tabular data can be identified and extracted for other processing, such as indexing. An embodiment can be adapted to index documents by signatures. Given a query, such an embodiment allows navigating to the correct document or table in a large collection.

The description of the examples and embodiments described herein are described with respect to clues, hypotheses, documents, tabular data, and NLP in English language is not intended to be limiting on the illustrative embodiments. An embodiment can be implemented in a similar manner using documents, tabular data, and NLP in any language within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for subject-matter analysis of tabular data, the computer usable code comprising:
    computer usable code for receiving a first document including the tabular data;
    computer usable code for selecting a library of functional signatures for a first subject-matter domain, wherein a functional signature in the library of functional signatures for the first subject-matter domain comprises an expression, wherein the expression represents (i) a functional relationship of a first cell and a second cell and (ii) a semantic relationship of the first cell and the second cell, wherein the first cell is a cell in the tabular data, wherein the functional relationship describes a computation between a first value in the first cell and a second value in the second cell, and wherein the semantic relationship describes an organizational relationship between a first identifier associated with the first cell and a second identifier associated with the second cell;
    computer usable code for determining whether a threshold number of functional signatures from the selected library are applicable to the tabular data, wherein a functional signature is applicable to the tabular data when values in the tabular data correspond to an operation and a table structure specified in the functional signature;
    computer usable code responsive to the threshold number of functional signatures from the selected library being applicable to the tabular data, for performing natural language processing (NLP) of the first document according to a process for the first subject matter domain selected from a plurality of processes for respective subject matter domains;
    computer usable code for selecting a portion of tabular data in a second document;
    computer usable code for analyzing a functional relationship between at least two values in the portion;
    computer usable code for representing table-specific information in the functional relationship using generic equivalent information from the first subject-matter domain, forming the functional signature;
    computer usable code for adding the functional signature to a collection of functional signatures corresponding to the second document, forming a first collection; and
    computer usable code for discarding, as being document-specific functional signatures, those functional signatures from the first collection and a second collection of functional signatures that are not similar to each other within the threshold measure of similarity, the second collection of functional signatures corresponding to a third document.

2. The computer usable program product of claim 1, further comprising:
    computer usable code for selecting the first collection and a second collection of functional signatures corresponding to a third document;
    computer usable code for clustering those functional signatures from the first and the second collections that are similar to each other within a threshold measure of similarity, forming a cluster of functional signatures; and computer usable code for adding the cluster of functional signatures to the library of functional signatures.

3. The computer usable program product of claim 1, further comprising:
computer usable code for storing a combination of the table-specific information in the functional relationship and the generic equivalent information from the first subject-matter domain in a knowledge repository corresponding to the first subject-matter domain.

4. The computer usable program product of claim 1, further comprising:
computer usable code for receiving a query to be answered using the first document;
computer usable code for parsing the query using a knowledge repository corresponding to the library of functional signatures for the first subject-matter domain;
computer usable code for selecting a functional signature that fits the query according to the parsing;
computer usable code for extracting data from a portion of the tabular data of the first document where the selected functional signature applies;
computer usable code for responding to the query using the extracted data.

5. The computer usable program product of claim 4, wherein the computer usable code for responding further comprises computer usable code for sending the extracted data to a natural language processing application where the extracted data is formed into a natural language response to the query.

6. The computer usable program product of claim 1, wherein the computer usable code for processing the first document comprises:
computer usable code for classifying the first document as belonging to the first subject-matter domain.

7. The computer usable program product of claim 1, wherein the computer usable code is stored in a computer readable storage device in a data processing system, and wherein the computer usable code is transferred over a network from a remote data processing system.

8. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

9. The computer usable program product of claim 1, wherein the second cell is a cell outside the tabular data.

10. The computer usable program product of claim 1, wherein the first identifier associated with the first cell is a header and the second identifier associated with the second cell is an indentation in a placement of the second cell in the tabular data.

11. The computer usable program product of claim 1, wherein the first identifier associated with the first cell is a header and the second identifier associated with the second cell is a sub-header of the header.

12. The computer usable program product of claim 1, wherein the first cell and the second cell are in different rows of the tabular data.

13. A data processing system for subject-matter analysis of tabular data, the data processing system comprising:
a storage device including a storage medium, wherein the storage device stores computer usable program code; and
a processor, wherein the processor executes the computer usable program code, and wherein the computer usable program code comprises:
computer usable code for receiving a first document including the tabular data;
computer usable code for selecting a library of functional signatures for a first subject-matter domain, wherein a functional signature in the library of functional signatures for the first subject-matter domain comprises an expression, wherein the expression represents (i) a functional relationship of a first cell and a second cell and (ii) a semantic relationship of the first cell and the second cell, wherein the first cell is a cell in the tabular data, wherein the functional relationship describes a computation between a first value in the first cell and a second value in the second cell, and wherein the semantic relationship describes an organizational relationship between a first identifier associated with the first cell and a second identifier associated with the second cell;
computer usable code for determining whether a threshold number of functional signatures from the selected library are applicable to the tabular data, wherein a functional signature is applicable to the tabular data when values in the tabular data correspond to an operation and a table structure specified in the functional signature;
computer usable code responsive to the threshold number of functional signatures from the selected library being applicable to the tabular data, for performing natural language processing (NLP) of the first document according to a process for the first subject matter domain selected from a plurality of processes for respective subject matter domains;
computer usable code for selecting a portion of tabular data in a second document;
computer usable code for analyzing a functional relationship between at least two values in the portion;
computer usable code for representing table-specific information in the functional relationship using generic equivalent information from the first subject-matter domain, forming the functional signature;
computer usable code for adding the functional signature to a collection of functional signatures corresponding to the second document, forming a first collection; and
computer usable code for discarding, as being document-specific functional signatures, those functional signatures from the first collection and a second collection of functional signatures that are not similar to each other within the threshold measure of similarity, the second collection of functional signatures corresponding to a third document.

* * * * *